US005240628A

United States Patent [19]

Kanno et al.

[11] Patent Number: 5,240,628

[45] Date of Patent: Aug. 31, 1993

[54] PROCESS FOR PRODUCING MAGNETIC FLUID

[75] Inventors: Takao Kanno, Tokyo; Yutaka Kouda, Yokohama; Yasuki Karita, Sagamihara; Hirokazu Nagato; Takahiro Ishizuka, both of Fujisawa, all of Japan

[73] Assignee: NOK Corporation, Tokyo, Japan

[21] Appl. No.: 808,928

[22] Filed: Dec. 18, 1991

[30] Foreign Application Priority Data

| | | | |
|---|---|---|---|
| Dec. 21, 1990 | [JP] | Japan | 2-413284 |
| Dec. 21, 1990 | [JP] | Japan | 2-413287 |
| Dec. 21, 1990 | [JP] | Japan | 2-413288 |
| Aug. 2, 1991 | [JP] | Japan | 3-216306 |
| Sep. 6, 1991 | [JP] | Japan | 3-254472 |

[51] Int. Cl.5 ........................ C01G 49/08; C04B 35/26

[52] U.S. Cl. .............................. 252/62.56; 252/62.51; 252/62.52; 427/216; 427/220

[58] Field of Search ............... 252/62.52, 62.51, 62.56; 427/216, 220

[56] References Cited

U.S. PATENT DOCUMENTS

| | | | |
|---|---|---|---|
| Re. 32,573 | 1/1988 | Furumura | 252/62.52 |
| 3,531,413 | 9/1970 | Rosensweig | 252/61.51 R |
| 4,019,994 | 4/1977 | Kelley | 252/61.51 R |
| 4,956,113 | 9/1990 | Kanno | 252/62.52 |
| 4,976,883 | 12/1990 | Kanno et al. | 252/62.52 |
| 5,064,550 | 11/1991 | Wyman | 252/62.51 R |

OTHER PUBLICATIONS

*Smalheer & Smith*, "Lubricant Additives", 1967 pp. 4–5.

*Primary Examiner*—Prince Willis, Jr.
*Assistant Examiner*—Alan D. Diamond
*Attorney, Agent, or Firm*—Lowe, Price, LeBlanc & Becker

[57] ABSTRACT

A magnetic fluid is produced by adding a solution of N-polyalkylenepolyamine-substituted alkenylsuccinimide in a hydrocarbon solvent to an aqueous suspension of fine particles of ferrites, thereby adsorbing the N-polyalkylenepolyamine-substituted alkenylsuccinimide onto the fine particles of ferrites, distilling off water and the hydrocarbon solvent therefrom, and dispersing the fine particles of N-polyalkylenepolyamine-substituted alkenylsuccinimide-adsorbed magnetites as residues into a base oil of low vapor pressure having a vapor pressure of not more than 0.1 mmHg at 25° C.

29 Claims, No Drawings

PROCESS FOR PRODUCING MAGNETIC FLUID

BACKGROUND OF THE INVENTION

1. Field of the Invention

The present invention relates to a process for producing a magnetic fluid, and more particularly to a process for producing a magnetic fluid having an improved saturation magnetization by stably dispersing fine particles of ferrites in a base oil of low vapor pressure at a high concentration.

2. Discription of the Prior Art

Fine particles of ferrites are produced by pulverization, coprecipitation or vapor deposition, and a coprecipitation process is preferably used from the viewpoints of purity, particle size control and productivity. However, the coprecipitation process is based on a precipitation reaction in an aqueous solution containing iron ions, and thus the fine magnetic particles are obtained in an aqueous suspension.

On the other hand, it is desirable that fine magnetic particles for a magnetic fluid are discretely dispersed in a liquid without any coagulation. In case of producing a magnetic particles by coprecipitation, it is necessary that a surfactant for preventing deposition and coagulation is adsorbed onto the surfaces of fine particles in a dispersion state without any drying step involving a risk of deposition and coagulation of fine particles themselves. To this end, a water-soluble surfactant is used.

In a magnetic fluid containing a water-soluble surfactant-adsorbed, fine magnetic particles in a dispersion state, the base oil for dispersion is restricted to solvents having a relatively high volatility such as kerosene and toluene. When a magnetic fluid is applied to magnetic fluid sealing or magnetic fluid polishing, evaporation of the base oil will deteriorate the function of the magnetic fluid itself.

A magnetic fluid is a dispersion of fine particles of ferrites in a base oil, dispersed usually with a dispersing agent such as a higher fatty acid salt or sorbitan ester. When fine particles of ferrites are to be simply dispersed in a base oil of low vapor pressure, any higher dispersibility cannot be obtained, and the resulting dispersion has no practical value.

Even if a good dispersibility could be obtained in the dispersion into such a base oil of low vapor pressure, the base oil of low vapor pressure has a dynamic viscosity as high as about 8 to about 50 Cst (40° C.) in contrast to ordinary organic solvents and water having a dynamic viscosity of less than 1 Cst (40° C.), and thus it takes a very long time to form a homogeneous suspension. Furthermore, all the fine particles of ferrites are not always formed into a stable suspension, and a considerable proportion of fine particles of ferrites is removed during purification such as centrifuge, resulting in very poor yield.

SUMMARY OF THE INVENTION

The object of the present invention is to produce a magnetic fluid in good yield, which comprises fine particles of ferrites dispersed in a base oil of low vapor pressure stably at a high concentration.

DETAILED DESCRIPTION OF THE PREFERRED EMBODIMENTS

The present invention provides a process for producing a magnetic fluid, which comprises adding a solution of N-polyalkylenepolyamine-substituted alkenylsuccinimide in a water-insoluble or sparingly soluble organic solvent to an aqueous suspension of fine particles of ferrites, thereby adsorbing the N-polyalkylenepolyamine-substituted alkenylsuccinimide onto the fine particles of ferrites, then distilling off water and the organic solvent therefrom, and dispersing the fine particles of N-polyalkylenepolyamine-substituted alkenylsuccinimide-adsorbed ferrites as residues into a base oil of low vapor pressure having a vapor pressure of not more than 0.1 mmHg at 25° C.

Fine particles of ferrites prepared by a coprecipitation process, which is preferable from the viewpoints of purity, particle size control and productivity, are used in an aqueous suspension state directly as obtained. Formation of an aqueous suspension by a concentration process can be carried out through a series of steps such as dropwise addition of an aqueous NaOH solution to an aqueous solution containing a mixture of iron salts, ageing, cooling and decantation of salts, whereby a suspension containing about 0.1 to about 50% by weight, preferably about 1 to about 30% by weight, of ferrites having particle size of about 50 to about 300 Å, preferably about 70 to about 120 Å, can be obtained.

As an N-polyalkylenepolyamine-substituted alkenylsuccinimide, compounds represented by the following formulae:

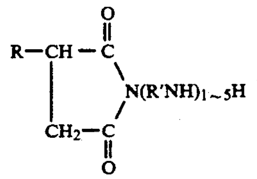

or

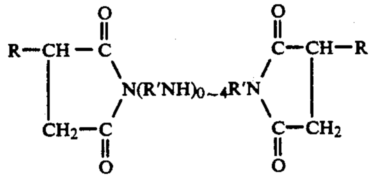

wherein R is hydrocarbon group having 12 to 24 carbon atoms or a polybutenyl group having a molecular weight of about 300 to about 2,000 and R' is an alkylene group having 1 to 6 carbon atoms and can be the same or different when at least two of R' are repeated, are used in the present invention.

The N-polyalkylenepolyamine-substituted alkenylsuccinimide is used as a solution containing the same at a concentration of about 0.01M to about 0.5M, preferably about 0.1M to about 0.5M in a water-insoluble or sparingly soluble organic solvent.

The organic solvent includes, for example, aliphatic, alicyclic or aromatic hydrocarbons having a boiling point of about 60° to about 200° C. such as n-hexane, n-heptane, n-octane, i-octane, n-decane, cyclohexane, toluene, xylene, mesitylene, petroleum ether, petroleum benzine, ligroin, naphtha, etc.; halogenated hydrocarbons such as chlorobenzene, carbon tetrachloride, dichloroethane, perchloroethylene, chlorohexane, dichlorobenzene, bromobenzene, bromotoluene, bromohexane, etc.; esters such as propyl butyrate, butyl butyrate, ethyl valerate, propyl valerate, butyl valerate, ethyl isovalerate, etc.; ethers such as dibutyl ether, dipentyl ether, dihexyl ether, anisol, phenetol, etc.; ketones having at least 5 carbon atoms such as methylisobutylketone, methyl-n-amylketone, di-n-propylketone, methylcyclohexanone, etc.; and nitriles such as benzonitrile, butyronitrile, valeronitrile, tolylnitrile, etc.

The solution of N-polyalkylenepolyamine-substituted alkenylsuccinimide in the organic solvent is used in a ratio by volume to the aqueous suspension of about 0.01 to about 100, preferably about 1 to about 100. Mixing of the solution with the aqueous suspension is carried out in a homogenizer, etc. under such stirring conditions so as to form an emulsion. By stirring under such stirring conditions, N-polyalkylenepolyamine-substituted alkenylsuccinimide is adsorbed onto the fine particles of ferrite at the boundary surface of the emulsion. In order to accelerate the adsorption, it is preferable to conduct the stirring at a temperature of about 40° to about 90° C. for about 30 to about 60 minutes.

Then, water and the organic solvent are distilled off, and the residues are washed with a solvent mixture, usually, an equivolume solvent mixture, of toluene-acetone, toluene-methanol, n-hexane-acetone, i-octane-acetone, etc. By washing, excess N-polyalkylenepolyamine-substituted alkenylsuccinimide, which increases the viscosity of the resulting magnetic fluid or lower the concentration of dispersed fine particles of ferrites, can be removed. After the washing, the fine particles of ferrites are dried, if necessary.

As an organic solvent for dissolving N-polyalkylenepolyamine-substituted alkenylsuccinimide as a surfactant, the above-mentioned hydrocarbons and other organic solvents are used, among which the latter other organic solvents are preferably used. That is, the surfactant is highly soluble in oil and thus is readily soluble in the hydrocarbon-based organic solvents. However, owing to the high solubility in oil, it seems that a larger portion of the surfactant is dissolved in the oil phase, i.e. hydrocarbon phase, when an emulsion is formed, as compared with the surfactant oriented to the boundary surface between the oil and the water. Thus, it seems that a proportion of the surfactant adsorbed on the surfaces of fine magnetic particles is smaller in the case of a hydrocarbon-based solvent, as compared with the total amount of the surfactant used.

It has been found as a result of investigation of the solubility of the surfactant that the surfactant can be completely dissolved in organic solvents of low or intermediate polarity such as hydrocarbons, halogenated hydrocarbons, esters, ketones having at least 5 carbon atoms, ethers, erc., but are only partly dissolved in organic solvents having a high polarity such as alcohols and acetone. Particularly, when the solubility parameter exceeds 10, the surfactants undergo only partial dissolution. Solvents having a low polarity such as hydrocarbons can more readily dissolve the surfactants than solvents having an intermediate polarity such as the other organic solvents.

It seems that the surfactant is dissolved as single molecules in a hydrocarbon solvent and this is an evidence for a very high compatibility with a hydrocarbon solvent. By dissolving the surfactant in the other organic solvent having a little higher polarity than that of hydrocarbon solvent, thereby lowering the compatibility of the surfactant with the oil phase, orientation of the surfactant to the boundary surface between the oil and the water can be improved. By forming an emulsion under a strong stirring condition from an aqueous suspension of fine magnetic particles in the state of improved orientation and conducting adsorption reaction of the surfactant, the dispersibility of an ultimately obtainable magnetic fluid can be further improved by about 1.2 to 2 times higher in terms of the saturation magnetization than when only a hydrocarbon solvent is used.

When a hydrocarbon solvent is used, the saturation magnetization of an ultimately obtainable magnetic fluid can be further improved by modifying the foregoing basic process as follows:

(1) By subjecting an aqueous suspension of fine particles of ferrites to ultrasonic treatment, adding a solution of N-polyalkylenepolyamine-substituted alkenylsuccinimide in a hydrocarbon solvent to the aqueous suspension, thereby adsorbing the N-polyalkylenepolyamine-substituted alkenylsuccinimide onto the fine particles of ferrites, distilling off water and the hydrocarbon solvent therefrom, and dispersing the fine particles of N-polyalkylenepolyamine-substituted alkenylsuccinimide-adsorbed ferrites as residues into a base oil of low vapor pressure having a vapor pressure of not more than 0.1 mmHg at 25° C., or (2) By adding a solution of N-polyalkylenepolyamine-substituted alkenyl-succinimide in a hydrocarbon solvent having a higher boiling point than that of water to an aqueous suspension of fine particles of ferrites, adsorbing the N-polyalkylenepolyamine-substituted alkenylsuccinimide onto the fine particles of ferrites, then removing water substantially completely therefrom, adding a coagulation solvent to the dispersion in the hydrocarbon solvent as residues, thereby recovering the fine particles of N-polyalkylenepolyamine-substituted alkenylsuccinimide-adsorbed ferrites, and dispersing the recovered fine particles into a base oil of low vapor pressure having a vapor pressure of not more than 0.1 mmHg at 25° C., or (3) By adding a solution of N-polyalkylenepolyamine-substituted alkenylsuccinimide in a hydrocarbon solvent to an aqueous suspension of fine particles of ferrites, adding an organic solvent, which has a miscibility with the hydrocarbon solvent and in which the N-polyalkylenepolyamine-substituted alkenylsuccinimide is sparringly soluble or insoluble, thereto slowly, thereby adsorbing the N-polyalkylenepolyamine-substituted alkenylsuccinimide onto the fine particles of ferrites, then distilling off the organic solvent, water and the hydrocarbon solvent therefrom, and dispersing the fine particles of N-polyalkylenepolyamine-substituted alkenylsuccinimide-adsorbed ferrites as residues into a base oil of low vapor pressure having a vapor pressure of not more than 0.1 mmHg at 25° C., or (4) By adding ions of ferrite-constituting metals to an aqueous suspension of fine particles of ferrites, adsorbing the ions of the ferrite-constituting metals onto the fine particles of ferrites, adding a solution of N-polyalkylenepolyamine-substituted alkenylsuccinimide in a hydrocarbon solvent thereto, thereby adsorbing the N-polyalkylenepolyamine-substituted alkenylsuccinimide onto the fine particles of ferrites, distilling off water and the hydrocarbon solvent therefrom, and dispersing the fine particles of N-polyalkylenepolyamine-substituted alkenylsuccinimide-adsorbed ferrites into a base oil of low vapor pressure having a vapor pressure of not more than 0.1 mmHg at 25° C.

In the foregoing modification (1), the formed aqueous suspension is used after ultrasonic treatment for about 0.5 to about 10 hours so as to disintegrate coagulation of fine particles of ferrites as much as possible and efficiently adsorb the N-polyalkylenepolyamine-substituted alkenylsuccinimide onto the fine particles of ferrites. The resulting ultrasonically treated aqueous suspension is mixed with a solution of N-polyalkylenepolyamine-substituted alkenylsuccinimide in hydrocarbon immediately after the ultrasonic treatment.

As a solution of N-polyalkylenepolyamine-substituted alkenylsuccinimide in hydrocarbon, solutions of N-polyalkylenepolyamine-substituted alkenylsuccinimide is used at a concetration of about 0.01 to about 0.5M, preferably about 0.1 to about 0.5M, in an aliphatic, alicyclic or aromatic hydrocarbon solvent having a boiling point of 60° to 200° C., such as n-hexane, n-heptane, n-octane, i-octane, n-decane, cyclohexane, toluene, xylene, mesitylene, petroleum ether, petroleum benzine, ligroin and naphtha.

The solution of N-polyalkylenepolyamine-substituted alkenylsuccinimide in the hydrocarbon solvent is used in a ratio by volume to the aqueous suspension of about 0.01 to about 100, preferably about 1 to about 100. Mixing of the solution with the aqueous suspension is carried out in a homogenizer, etc. under such stirring conditions as to form an emulsion. By stirring under such stirring conditions, N-polyalkylenepolyamine-substituted alkenylsuccinimide is adsorbed onto the fine particles of ferrites at the boundary surface of the emulsion. In order to accelerate the adsorption, it is preferably to conduct the stirring at a temperature of about 40° to about 90° C. for about 30 to about 60 minutes.

Then, water and the hdyrocarbon solvent are distilled off, and the residues are washed with a solvent mixture, usually, an equivolume solvent mixture, of toluene-acetone, toluene-methanol, n-hexane-acetone, i-octane-acetone, etc. By washing, excess N-polyalkylenepolyamine-substituted alkenylsuccinimide, which causes to increase the viscosity of the resulting magnetic fluid or lower the concentration of dispersed fine particles of ferrites, can be removed. After the washing, the fine particles of ferrites are dried, if necessary.

In the foregoing modification (2), N-polyalkylenepolyamine-substituted alkenylsuccinimide is added, as a solution in a hydrocarbon solvent having a higher boiling point than that of water, preferably about 150° C. or higher and incapable of forming an azeotrope with water, to the aqueous suspension of fine particles of ferrites. The hydrocarbon solvent includes, for example, n-decane, n-dodecane, 1-decene, n-hexadecane, mesitylene, diethylbenzene, tetralin, decalin, dodecylbenzene, toluene and xylene, which are used alone or in mixture as a solvent incapable of forming an azeotrope with water can be also used together with a solvent incapable of forming an azeotrope with water, such as toluene and xylene.

The solution of N-polyalkylenepolyamine-substituted alkenylsuccinimide in the hydrocarbon solvent is used in a ratio by volume to the aqueous suspension of about 0.01 to about 100, preferably about 1 to about 100. Mixing of the solution with the aqueous suspension is carried out in a homogenizer, etc. under such stirring conditions as to form an emulsion. By stirring under such stirring conditions, N-polyalkylenepolyamine-substituted alkenylsuccinimide is adsorbed onto the fine particles of ferrites at the boundary surface of the emulsion. In order to accelerate the adsorption, it is preferable to conduct the stirring at a temperature of about 40° to about 90° C. for about 30 to about 60 minutes.

After adsorption of N-polyalkylenepolyamine-substituted alkenylsuccinimide onto the fine particles of ferrites, water is almost completely removed from the emulsion. Water removal is carried out by heating the emulsion formed with heating under the stirring conditions to a temperature higher than the boiling point of water, usually to about 110° C. or higher, as it is, to distill off the water. When xylene or toluene is used together, it is distilled off as an azeotrope with water to accelerate the water distilling-off spead.

Almost complete removal of water results in discoloration of the dispersion, for example, turning from brown to blacking brown. Acetone, methylethylketone, methanol or ethanol having a compatibility with the hydrocarbon solvent, when added to the residues at the time of discoloration, acts as a coagulation solvent for the fine particles of N-polyalkylenepolyamine-substituted alkenylsuccinimide, and coagulates the fine particles. Precipitated fine particles are recovered by placing the mixture on a magnet, or fine particles of poor dispersion can be readily settled down by centrifuging the mixture at about 500 to about 1,000 G, and can be removed.

The recovered fine particles are washed with a solvent mixture, usually, an equal-volume mixture of toluene-acetone, toluene-methanol, n-hexane-acetone, or i-octane-acetone. The washing can eliminate excess N-polyalkylenepolyamine-substituted alkenylsuccinimide, which is a reason to increase the viscosity of a magnetic fluid or lower the concentration of dispersed fine particles of ferrites. After the washing, the fine particles of ferrites are dried, if required.

In the foregoing basic process, the adsorption reaction of N-polyalkylenepolyamine-substituted alkenylsuccinimide onto the fine particles of ferrites largely depends on the properties of an emulsion at that time, such as sizes of dispersed particles constituting an emulsion, etc., and there are no large change in the properties between the start and the end of adsorption reaction. Consequently, the adsorption reaction rate is so low that a sufficient amount of the surfactant is not adsorbed onto the fine particles and the drying step is carried out with an insufficient amount of adsorbed surfactant, resulting in coagulation of fine particles themselves. This is a largest reason for no more increase in the yield.

In the present process, on the other hand, it is easy to contact the fine particles existing in the aqueous phase with the surfactant oriented at the boundary surface between the oil and the water and thus the surfactant can be successively adsorbed onto the fine particles.

Fine particles that have adsorbed the surfactant to some extent can be transferred from the aqueous phase into the oil phase owing to the lipophilic property, and are in a discrete state from one another in the oil phase. With decreasing amount of water due to distilling-off of water, chances to contact the fine particles in the aqueous phase with the boundary surface increased, and it seems that the adsorption reaction of the surfactant is further accelerated.

It is not objectionable to conduct a washing step and a drying step to remove the impurities, but coagulation of fine particles themselves is prevented owing to adsorption of a sufficient amount of the surfactant and thus the fine particles can be readily dispersed into a base oil or a solvent of low polarity. The resulting magnetic fluid has a Newtonian property and thus has a distinguished dispersion stability.

In the foregoing modification (3), N-polyalkylenepolyamine-substituted alkenylsuccinimide is used as a solution containing the same as at a concentration of about 0.01 to about 0.5M, preferably about 0.1 to about 0.5M, in an aliphatic, alicyclic or aromatic hydrocarbon having a boiling point of about 60° to about 200° C., such as n-hexane, n-heptane, n-octane, i-octane, n-decane, cyclohexane, toluene, xylene, mesitylene, petroleum ether, petroleum benzine, ligroin and naphtha.

The solution of N-polyalkylenepolyamine-substituted alkenylsuccinimide in the hydrocarbon solvent is used in a ratio by volume to the aqueous suspension of about 0.01 to about 100, preferably about 1 to about 100. Mixing of the solution with the aqueous suspension is carried out in a homogenizer, etc. under such stirring conditions as to form an emulsion. By stirring under such stirring conditions, N-polyalkylenepolyamine-substituted alkenylsuccinimide is adsorbed onto the fine particles of ferrites at the boundary surface of the emulsion. In order to accelerate the adsorption, it is preferable to conduct the stirring at a temperature of about 40° to about 90° C. for about 30 to about 60 minutes.

With increasing adsorption of N-polyalkylenepolyamine-substituted alkenylsuccinimide onto the fine particles of ferrites, the concentration of N-polyalkylenepolyamine-substituted alkenylsuccinimide in the hydrocarbon is lowered and consequently the density of oriented N-polyalkylenepolyamine-substituted alkenylsuccinimide at the emulsion boundary surface is lowered. Thus, a sparingly soluble or insoluble organic solvent having a miscibility with hydrocarbon used as a solvent for the N-polyalkylenepolyamine-substituted alkenylsuccinimide and a solubility of N-polyalkylenepolyamine-substituted alkenylsuccinimide of not more than 1 mM is added to the emulsion at the adsorption.

Such organic solvents include, for example, alcohols such as methanol, ethanol, isopropanol, etc., and ketones such as acetone, methylethylketone. etc. The organic solvent is slowly added at a constant rate of addition to the emulsion in a ratio by volume of the organic solvent to the hydrocarbon as a solvent for the N-polyalkylenepolyamine-substituted alkenylsuccinimide of about 0.5 to about 1 during the period by completion of the stirring treatment at the adsorption, whereby the density of oriented N-polyalkylenepolyamine-substituted alkenylsuccinimide at the emulsion boundary surface can be maintained as desired and the N-polyalkylenepolyamine-substituted alkenylsuccinimide can be efficiently absorbed onto the fine particles of ferrites.

The solution of N-polyalkylenepolyamine-substituted alkenylsuccinimide in the hydrocarbon solvent is used in a ratio by volume to the aqueous suspension of about 0.01 to about 100, preferably about 1 to about 100. Mixing of the solution with the aqueous suspension is carried out in a homogenizer, etc. under such stirring conditions as to form an emulsion. By stirring under such stirring conditions, N-polyalkylenepolyamine-substituted alkenylsuccinimide is adsorbed onto the fine particles of ferrites at the boundary surface of the emulsion. In order to accelerate the adsorption, it is preferable to conduct the stirring at a temperature of about 40° to about 90° C. for about 30 to about 60 minutes.

In the foregoing modification (4), ion species of Fe, Mn, Ni, Zn and Co are added as ferrite-constituting metal species to the thus formed aqueous suspension of fine particles of ferrites. These metal ion species are used, because they have less possibility to give an influence on the magnetization characteristic of fine particles of ferrites.

More specifically, chlorides, sulfates or nitrates of these metal species are added in the form of an aqueous solution at a concentration of about 0.05 to about 0.5M to make the concentration of metal ion species about 0.005 to about 0.05M. In order to adsorb the metal ion species onto the fine particles of ferrites, stirring is carried out for about 0.5 to about 3 hours, for example, in a homogenizer.

When the metal ion species is adsorbed onto the surfaces of fine particles and when the adsorption is completed, the fine particles of ferrites can be more easily dispersed in water owing to the repulsive forces of the adsorbed metal ion species. Fine particles will be coagulated and settled if the amount of metal ion species is even either too large or too small. An optimum concentration is about 0.005 to about 0.05M, as mentioned above.

The aqueous suspension containing metal ion species-adsorbed fine particles of ferrites is mixed with a solution of N-polyalkylenepolyamine-substituted alkenylsuccinimide in hydrocarbon immediately after the adsorption treatment.

N-polyalkylenepolyamine-substituted alkenylsuccinimide is used as a solution containing the same at a concentration of about 0.01 to about 0.5M, preferably about 0.1 to about 0.5M in an aliphatic, alicyclic or aromatic hydrocarbon having a boiling point of about 60° to about 200° C., such as n-hexane, n-heptane, n-octane, i-octane, n-decane, cyclohexane, toluene, xylene, mesitylene, petroleum ether, petroleum benzine, ligroin and naphtha.

The solution of N-polyalkylenepolyamine-substituted alkenylsuccinimide in the hydrocarbon solvent is used in a ratio by volume to the aqueous suspension of about 0.01 to about 100, preferably about 1 to about 100. Mixing of the solution with the aqueous suspension is carried out in a homogenizer, etc. under such stirring conditions as to form an emulsion. By stirring under such stirring conditions, N-polyalkylenepolyamine-substituted alkenylsuccinimide is adsorbed onto the fine particles of ferrites at the boundary surface of the emulsion. In order to accelerate the adsorption, it is preferable to conduct the stirring at a temperature of about 40° to about 90° C. for about 30 to about 60 minutes.

Then, water and the hydrocarbon solvent are distilled off, and the residues are washed with a solvent mixture, usually, an equivolume solvent mixture, of toluene-acetone, toluene-methanol, n-hexane-acetone, i-octane-acetone, etc. By washing, excess N-polyalkylenepolyamine-substituted alkenylsuccinimide, which causes to increase the viscosity of the resulting magnetic fluid or lower the concentration of dispersed fine particles of ferrites, can be removed. After the washing, the fine particles of ferrites are dried, if necessary.

Fine particles of N-polyalkylenepolyamine-substituted alkenylsuccinimide-substituted ferrites obtained according to any one of the foregoing processes are admixed with a base oil of low vapor pressure and subjected to dispersion treatment, where dispersibility of the fine particles into the base oil of low vapor pressure has been improved.

The base oil of low vapor pressure is a liquid oil having vapor pressure of not more than 0.1 mmHg, preferably not more than 0.01 mmHg at 25° C., for example, natural oil such as white oil (liquid paraffin), mineral oil and spindle oil and synthetic oil such as higher alkyl benzene, higher alkyl naphthalene, and polybutene having a molecular weight of about 300 to about 2,000, or lubricating oil containing an antioxidant, an antiwear agent, an oiliness improver, a detergent dispersant, etc., and is used at a concentration of dispersed fine particles of ferrites of in an ultimately obtainable magnetic fluid of about 10 to about 50% by weight.

Dispersion treatment after the admixture of a base oil of low vapor pressure is carried out in at least one of a homogenizer, an ultrasonic mixer, a vibration mill, etc. according to the ordinary procedure. After the dispersion treatment, the resulting dispersion is purified by centrifuge or settling at a magnetic field gradient. Dispersion treatment can be also carried out after the adsorption treatment and washing without any drying step, where it is preferable from the viewpoint of dispersion concentration of a magnetic fluid, control of volatile components, etc. to subject the resulting magnetic fluid to heat treatment in reduced pressure to distill off low boiling components.

According to the present process, a magnetic fluid containing fine magnetic particles stably dispersed in a base oil of low vapor pressure, which can meet the necessary conditions for various applications including magnetic fluid sealing can be simply and efficiently produced. Furthermore, fine magnetic particles can be dispersed into a base oil of low vapor pressure at a high concentration such as about 40 to about 50% by weight, and thus saturation magnetization of a magnetic fluid can be enhanced. Still furthermore, the present process are well applicable to fine particles of ferrites obtained by a coprecipitation process and thus are free form such a restriction of the longest drawback of coprecipitation method that use of only a water-soluble surfactant is obligatory.

PREFERRED EMBODIMENTS OF THE INVENTION

The present invention will be explained in detail below, referring to Examples.

EXAMPLE 1

An aqueous 6N NaOH solution was dropwise added to 1,850 ml of an aqueous solution containing 184 g of $FeCl_2.4H_2O$ and 500 g of $FeCl_3.6H_2O$ with stirring until pH reached 11, and then the mixture was aged at 80° C. for 30 minutes and cooled. Then, the salts were removed from the mixture by decantation to obtain a suspension of magnetite having a magnetite concentration of 30% by weight.

100 ml of a 0.1M polybutenylsuccinimide tetraethylenepentamine solution in toluene was added to 15 ml of the suspension, and the mixture was stirred at 60° C. for 60 minutes in a round bottom separable flask having a capacity of 300 ml at 800 rpm with a propeller, 50 mm in diameter, to form an emulsion. Then, the emulsion was heated at 50° C. in reduced pressure to distill off water and toluene. Fine particles of magnetite as residues were washed 5 times with a 1:1 solvent mixture of toluene-acetone, and dried.

Then, 5.0 g of higher alkyl naphthalene was added to 3.0 g of the resulting polybutenylsuccinimide tetraethylenepentamine-adsorbed magnetite, and the mixture was stirred at 10,000 rpm for 60 minutes by a homogenizer (Excel autohomogenizer, type DX, made by Nihon Seiki Seisakusho, Japan), and then subjected to ultrasonic dispersion treatment for 12 hours, and then to centrifuge at 5,000 G for 30 minutes to remove the precipitates therefrom. A magnetic fluid having a saturation magnetization (16K Oe) of 250 G was obtained thereby.

EXAMPLE 2

100 ml of a 0.2M polybutenylsuccinimide tetraethylenepentamine solution in n-hexane was added to 20 ml of the suspension of magnetite obtained in Example 1, and the mixture was stirred at 40° C. for 60 minutes under the same stirring conditions as in Example 1 to form an emulsion. Then, the emulsion was heated at 60° C. under reduced pressure in an evaporator to distill off water and n-hexane, and fine particles of magnetite as residues were 5 times washed with a 1:1 solvent mixture of xylene-acetone, and dried.

Then, 5.0 g of higher alkyl naphthalene was added to 5.0 g of the resulting polybutenylsuccinimide tetraethylenepentamine-adsorbed magnetite, and the mixture was subjected to ultrasonic dispersion treatment for 24 hours and then to centrifuge at 5,000 G for 30 minutes to remove the precipitates therefrom. A magnetic fluid having a saturation magnetization of 400 G was obtained thereby.

EXAMPLE 3

300 ml of a 0.4M polybutenylsuccinimide tetraethylenepentamine solution in ligroin was added to 50 ml of the suspension of magnetite obtained in Example 1, and the mixture was stirred at 70° C. for 30 minutes under the same stirring conditions as in Example 1 to form an emulsion. Then, the emulsion was heated at 60° C. under reduced pressure in an evaporator to distill off water and ligroin, and fine particles of magnetite as residues were 5 times washed with a 1:1 solvent mixture of toluene-methanol, and dried.

Then, 6.0 g of higher alkyl naphthalene was added to 6.0 g of the resulting polybutenylsuccinimide tetraethylenepentamine-adsorbed magnetite, and the mixture was subjected to ultrasonic dispersion treatment for 24 hours and then to centrifuge at 5,000 G for 30 minutes to remove the precipitates therefrom. A magnetic fluid having a saturation magnetization of 390 G was obtained thereby.

EXAMPLE 4

5.0 g of mineral oil was added to 5.0 g of the polybutenylsuccinimide tetraethylenepentamine-adsorbed magnetite obtained in Example 1, except that stirring was conducted by a homogenizer at 10,000 rpm, and then the mixture was subjected to ultrasonic dispersion treatment for 24 hours and then to centrifuge at 5,000 G for 30 minutes to remove the precipitates therefrom. A magnetic fluid having a saturation magnetization of 420 G was obtained thereby.

EXAMPLE 5

5.0 g of alkyldiphenylether was added to 6.0 g of the polybutenylsuccinimide tetraethylenepentamine-adsorbed magnetite obtained in Example 2, except that stirring was conducted by a homogenizer at 10,000 rpm, and then the mixture was subjected to ultrasonic dispersion treatment for 24 hours and then to centrifuge at 5,000 G for 30 minutes to remove the precipitates therefrom. A magnetic fluid having a saturation magnetization of 440 G was obtained thereby.

EXAMPLE 6

A magnetic fluid having a saturation magnetization of 330 G was obtained in the same manner as in Example 1, except that chlorobenzene was used in place of toluene.

EXAMPLE 7

A magnetic fluid having a saturation magnetization of 350 G was obtained in the same manner as in Example 1, except that benzonitrile was used in place of toluene.

EXAMPLE 8

A magnetic fluid having a saturation magnetization of 310 G was obtained in the same manner as in Example 1, except that butyl butrate was used in place of toluene.

EXAMPLE 9

A magnetic fluid having a saturation magnetization of 470 G was obtained in the same manner as in Example 2, except that dibutylether was used in place of n-hexane.

EXAMPLE 10

A magnetic fluid having a saturation magnetization of 470 G was obtained in the same manner as in Example 3, except that methylisobutylketone was used in place of ligroin.

COMPRATIVE EXAMPLE 1

100 ml of a 0.005M polybutenylsuccinimide tetraethylenepentamine solution in toluene was added to 15 ml of the suspension of magnetite obtained in Example 1 and the mixture was stirred, but no emulsion was formed. The mixture was treated at 60° C. for 60 minutes as it was, and then heated at 50° C. under reduced pressure in an evaporator to distill off water and toluene. Fine particles of magnetite as residues were 5 times washed with a 1:1 solvent mixture of toluene-acetone, and dried.

Then, 5.0 g of higher alkyl naphthalene was added to 3.0 g of the resulting fine particles of magnetite, and the mixture was stirred at 10,000 rpm for 60 minutes by a homogenizer and then subjected to ultrasonic dispersion treatment for 12 hours and to centrifuge at 5,000 G for 30 minutes to remove the precipitates therefrom. An almost clear supernatant liquid was obtained thereby.

EXAMPLE 11

An aqueous 6N NaOH solution was dropwise added to 1,850 ml of an aqueous solution containing 184 g of $FeCl_2 \cdot 4H_2O$ and 500 g of $FeCl_3 \cdot 6H_2O$ with stirring until pH reached 11, and then the mixture was aged at 80° C. for 30 minutes and cooled. Then, the salts were removed from the mixture by decantation to obtain a suspension of magnetite having a magnetite concentration of 10% by weight.

The suspension was subjected to ultrasonic exposure for one hour, and then immediately 100 ml of a 0.1M polybutenylsuccinimide tetraethylenepentamine solution in toluene was added to 45 ml of the suspension, and the mixture was stirred at 60° C. for 60 minutes in a round bottom separable flask having a capacity of 300 ml at 800 rpm with a propeller, 50 mm in diameter, to form an emulsion. Then, the emulsion was heated at 50° C. in reduced pressure to distill off water and toluene. Fine particles of magnetite as residues were washed 5 times with a 1:1 solvent mixture of toluene-acetone, and dried.

Then, 5.0 g of higher alkyl naphthalene was added to 3.0 g of the resulting polybutenylsuccinimide tetraethylenepentamine-adsorbed magnetite, and the mixture was stirred at 10,000 rpm for 60 minutes by a homogenizer, and then subjected to ultrasonic dispersion treatment for 12 hours, and then to centrifuge at 5,000 G for 30 minutes to remove the precipitates therefrom. A magnetic fluid having a saturation magnetization (16K Oe) of 280 G was obtained thereby.

EXAMPLE 12

After ultrasonic treatment of 60 ml of the suspension of magnetite obtained in Example 11 for 3 hours, 100 ml of a 0.2M polybutenylsuccinimide tetraethylenepentamine solution in n-hexane was added thereto, and the mixture was stirred at 40° C. for 60 minutes under the same stirring conditions as in Example 11 to form an emulsion. Then, the emulsion was heated at 60° C. under reduced pressure in an evaporator to distill off water and n-hexane. Fine particles of magnetite as residues were washed 5 times with a 1:1 solvent mixture of xyleneacetone, and dried.

Then, 5.0 g of higher alkyl naphthalene was added to 5.0 g of the resulting polybutenylsuccinimide tetraethylenepentamine-absorbed magnetite, and the mixture was subjected to ultrasonic dispersion treatment for 24 hours and then to centrifuge at 5,000 G for 30 minutes to remove the precipitates therefrom. A magnetic fluid having a saturation magnetization of 420 G was obtained thereby.

EXAMPLE 13

After ultrasonic treatment of 50 ml of the suspension of magnetite obtained in Example 11 for 3 hours, 100 ml of a 0.4M polybutenylsuccinimide tetraethylenepentamine solution in ligroin was added thereto, and the mixture was stirred at 70° C. for 30 minutes under the same stirring conditions as in Example 11 to form an emulsion. Then, the emulsion was heated at 60° C. under reduced pressure in an evaporator to distill off water and ligroin, and fine particles of magnetite as residues were 5 times washed with a 1:1 solvent mixture of toluene-ethanol and dried.

Then, 4.0 g of higher alkyl naphthalene was added to 4.0 g of the resulting polybutenylsuccinimide tetraethylenepentamine-absorbed magnetite, and the mixture was subjected to ultrasonic treatment for 24 hours and then to centrifuge at 5,000 G for 30 minutes to remove the precipitates. A magnetic fluid having a saturation magnetization of 430 G was obtained thereby.

EXAMPLE 14

100 ml of a 0.1M polybutenylsuccinimide tetraethylenepentamine solution in tetralin was added to 15 ml of the suspension obtained in Example 1, and the mixture was stirred at 60° C. for 60 minutes in a round bottom separable flask having a capacity of 300 ml with a propeller, 50 mm in diameter, at 800 rpm to form an emulsion.

Then, water was distilled off therefrom with stirring over an oil bath kept at 130° C. and almost completely removed therefrom when the emulsion turned blackish brown from brown. It was judged, that the emulsion was only in tetralin. Then, 200 ml of acetone was added, whereby dispersed fine particles are coagulated and settled by placing the flask on a magnet. Then, tetralin was removed therefrom by decantation.

Fine particles of magnetite as residues were 5 times washed with a 1:1 solvent mixture of toluene-acetone, and dried.

Then, 5.0 g of higher alkyl naphthalene was added to 3.0 g of the resulting polybutenylsuccinimide tetraethylene pentamine-adsorbed magnetite, and the mixture was stirred at 10,000 rpm for 60 minutes in a homogenizer, and then subjected to ultrasonic dispersion treatment for 12 hours and then to centrifuge at 5,000 G for 30 minutes to remove the precipitates therefrom. A magnetic fluid having a saturation magnetization (16K Oe) of 370 G was obtained. The yield was found to be 1.5 times that of Example 1.

EXAMPLE 15

100 ml of a 0.2M polybutenylsuccinimide tetraethylenepentamine solution in n-dodecane was added to 20 ml of the suspension of magnetite obtained in Example 1 and the mixture was stirred at 40° C. for 60 minutes under the same stirring conditions as in Example 14 to form an emulsion. Then, the emulsion was heated at 140° C. to remove water therefrom, and 200 ml of ethanol was added thereto to coagulate fine particles. Then, the mixture was subjected to centrifuge at 500 G for 30 minutes to recover the fine particles. The recovered fine particles of magnetite were 5 times washed with a 1:1 solvent mixture of xylene-acetone, and dried.

Then, 5.0 g of higher alkyl naphthalene was added to 4.0 g of the resulting polybutenylsuccinimide tetraethylenepentamine-adsorbed magnetite, and the mixture was subjected to ultrasonic dispersion treatment for 24 hours and then to centrifuge at 5,000 G for 30 minutes to remove the precipitates therefrom. A magnetic fluid having a saturation magnetization of 510 G was obtained thereby.

EXAMPLE 16

300 ml of a 0.4M polybutenylsuccinimide tetraethylenepentamine solution in a solvent mixture of hexadecane-xylene was added to 50 ml of the suspension of magnetite obtained in Example 1, and the mixture was stirred at 70° C. for 30 minutes under the same stirring conditions as in Example 14 to form an emulsion.

Then, the emulsion was heated at 160° C. remove water and xylene therefrom, and then 200 ml of acetone was added to the residues. Then, the mixture was placed on a magnet to recover settled fine particles. The recovered fine particles of magnetite were 5 times washed with a 1:1 solvent mixture of toluene-methanol, and dried.

Then, 6.0 g of higher alkyl naphthalene was added to 6.0 g of the resulting polybutenylsuccinimide tetraethylenepentamine-adsorbed magnetite, and the mixture was subjected to ultrasonic dispersion treatment for 24 hours and then to centrifuge at 5,000 G for 30 minutes to remove the precipitates therefrom. A magnetic fluid having a saturation magnetization of 530 G was obtained thereby.

The magnetic fluids obtained in the foregoing Examples 14 to 16 and 1 to 3 were each subjected to more severe centrifuge with a centrifugal force, e.g. at 15,000 G, for 30 minutes, to remove the precipitates therefrom, and saturation magnetizations of the resulting magnetic fluids were measured and compared with those before the severe centrifuge. Results are given below. It is apparent therefrom that the dispersion stability of the magnetic fluids obtained in Examples 14 to 16 is much better than that of the magnetic fluids obtained in Examples 1 to 3.

| | Saturation magnetization (unit:G) | |
|---|---|---|
| Example No. | Before severe centrifuge | After severe centrifuge |
| 14 | 370 | 340 |
| 15 | 510 | 470 |
| 16 | 530 | 470 |
| 1 | 250 | 180 |
| 2 | 400 | 290 |
| 3 | 390 | 300 |

EXAMPLE 17

100 ml of a 0.1M polybutenylsuccinimide tetraethylene-pentamine solution in toluene was added to 45 ml of the suspension obtained in Example 11, and the mixture was stirred at 800 rpm in a round bottom separable flask having a capacity of 300 ml with a propeller, 50 mm in diameter, to form an emulsion. Acetone was dropwise added to the emulsion at 50° C. at a tricking rate of 1 ml/min. to continue the stirring for 60 minutes. Then, the mixture was heated at 50° C. in reduced pressure in a rotary evaporator to distill off acetone, water and toluene. Fine particles of magnetite as residues were 5 times washed with a 1:1 solvent mixture of toluene-acetone, and dried.

Then, 10.0 g of higher alkyl naphthalene was added to 6.0 g of the resulting polybutenylsuccinimide tetraethylene-pentamine-adsorbed magnetite, and the mixture was stirred at 10,000 rpm for 60 minutes in a homogenizer and subjected to ultrasonic treatment for 12 hours and then to centrifuge at 5,000 G for 30 minutes to remove the precipitates therefrom. A magnetic fluid having a saturation magnetization (16K Oe) of 290 G was obtained thereby.

EXAMPLE 18

100 ml of a 0.2M polybutenylsuccinimide tetraethylene-pentamine solution in n-hexane was added to 60 ml of the suspension of magnetite obtained in Example 11, and the mixture was stirred under the same stirring conditions as in Example 17 to form an emulsion. Then, ethanol was dropwise added to the emulsion at 40° C. at a tricking rate of 1 ml/min. to continue the stirring for 60 minutes. Then, the mixture was heated at 60° C. under reduced pressure to distill off ethanol, water and n-hexane. Fine particles of magnetite as residues were washed 5 times with a 1:1 solvent mixture of xylene-acetone, and dried.

Then, 5.0 g of higher alkyl naphthalene was added to 5.0 g of the resulting polybutenylsuccinimide tetraethylene-pentamine-adsorbed magnetite, and the mixture was subjected to ultrasonic dispersion treatment for 24 hours and then to centrifuge at 5,000 G for 30 minutes to remove the precipitates therefrom. A magnetic fluid having a saturation magnetization of 440 G was obtained thereby.

COMPARATIVE EXAMPLE 2

A magnetic fluid having a saturation magnetization of 240 G was obtained in the same manner as in Example 17, except that the stirring treatment was conducted without the dropwise addition of acetone.

EXAMPLE 19

20 ml of an aqueous 0.1M $FeCl_3$ solution was added to 45 ml of the suspension obtained in Example 11. After treatment of the solution (0.03M as Fe ions) in a homogenizer for 60 minutes, 100 ml of a 0.1M polybutenylsuccinimide tetraethylenepentamine solution in toluene was added thereto, and the mixture was stirred at 60° C. for 60 minutes in a round bottom separable flask having a capacity of 300 ml with a propeller, 50 mm in diameter, at 800 rpm to form an emulsion. Then, the emulsion was heated at 50° C. under reduced pressure in a rotary evaporator to distill off water and toluene. Fine particles of magnetite as residues were washed 5 times with a 1:1 solvent mixture of toluene-acetone, and dried.

Then, 5.0 g of higher alkyl naphthalene was added to 3.0 g of the resulting polybutenylsuccinimide tetraethylenepentamine-adsorbed magnetite, and the mixture was stirred at 10,000 rpm for 60 minutes in a homogenizer, and subjected to ultrasonic dispersion treatment for 12 hours and then to centrifuge at 5,000 G for 30 minutes to remove the precipitates. A magnetic fluid having a saturation magnetization (16K Oe) of 270 G was obtained.

EXAMPLE 20

40 ml of an aqueous 0.05M $Fe(NO_3)_3$ solution was added to 60 ml of the suspension of magnetite obtained in Example 11. After treatment of the solution (0.02M as Fe ions) in a homogenizer for 90 minutes, 100 ml of a 0.2M polybutenylsuccinimide tetraethylenepentamine solution in n-hexane was added thereto and the mixture was stirred at 40° C. for 60 minutes under the same stirring conditions as in Example 19 to form an emulsion. Then, the emulsion was heated under reduced pressure in an evaporator to distill off water and n-hexane. Fine particles of magnetite as residues were 5 times washed with a 1:1 solvent mixture of xylene-acetone, and dried.

Then, 5.0 g of higher alkyl naphthalene was added to 5.0 g of the resulting polybutenylsuccinimide tetraethylenepentamine-adsorbed magnetite, and the mixture was subjected to ultrasonic dispersion treatment for 24 hours and then to centrifuge at 5,000 G for 30 minutes. A magnetic fluid having a saturation magnetization of 430 G was obtained thereby.

EXAMPLE 21

50 ml of an aqueous 0.05M $Fe_2(SO_4)_3$ solution was added to 50 ml of the suspension of magnetite obtained in Example 1. After treatment of the solution (0.05M as Fe ions) in a homogenizer, 100 ml of a 0.4M polybutenylsuccinimide tetraethylenepentamine solution in ligroin was added thereto, and the mixture was stirred at 70° C. for 30 minutes under the same stirring conditions as in Example 19 to form an emulsion. Then, the emulsion was heated at 60° C. under reduced pressure in an evaporator to distill off water and ligroin. Fine particles of magnetite as residues were washed 5 times with a 1:1 solvent mixture of toluene-methanol, and dried.

4.0 g of higher alkyl naphthalene was added to 4.0 g of the resulting polybutenylsuccinimide tetraethylenepentamineadsorbed magnetite, and the mixture was subjected to ultrasonic dispersion treatment for 24 hours and then to centrifuge at 5,000 G for 30 minutes. A magnetic fluid having a saturation magnetization of 400 G was obtained thereby.

What is claimed is:

1. A process for producing a magnetic fluid, which comprises adding a solution of N-polyalkylenepolyamine-substituted alkenylsuccinimide in a water-insoluble or water-sparingly soluble organic solvent to an aqueous suspension of fine particles of ferrites and stirring the resulting mixture, thereby forming an emulsion and adsorbing the N-polyalkylenepolyamine-substituted alkenylsuccinimide onto the fine particles of ferrites, then distilling off water and the organic solvent therefrom and dispersing the fine particles of N-polyalkylenepolyamine-substituted alkenylsuccinimide-adsorbed ferrites into a base oil of low vapor pressure having a vapor pressure of not more than 0.1 mmHg at 25° C.

2. A process according to claim 1 wherein the formation of the emulsion and the adsorption of the N-polyalkylenepolyamine-substituted alkenylsuccinimide onto the fine particles of ferrites by stirring is carried out at a temperature of about 40° to about 90° C.

3. A process according to claim 1 wherein the aqueous suspension of fine particles of ferrites is obtained by coprecipitation.

4. A process according to claim 1 wherein the N-polyalkylenepolyamine-substituted alkenylsuccinimide is represented by the following formulae:

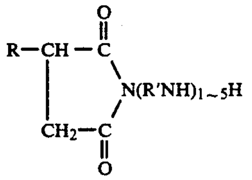

or

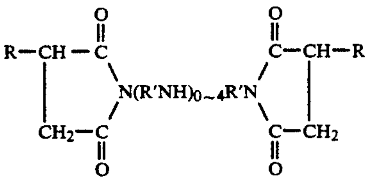

wherein R is a hydrocarbon group having 12 to 24 carbon atoms or a polybutenyl group having a molecular weight of about 300 to about 2,000 and R' is an alkylene group having 1 to 6 carbon atoms and can be the same or different when at least two of R' are repeated.

5. A process according to claim 1 wherein the water-insoluble or sparingly soluble organic solvent is hydrocarbon, halogenated hydrocarbon, ester, ether, ketone having at least 5 carbon atoms or nitrile.

6. A process according to claim 1 wherein the base oil of low vapor pressure is natural oil, synthetic oil or an additive-containing lubricating oil.

7. A process for producing a magnetic fluid, which comprises subjecting an aqueous suspension of fine particles of ferrites to ultrasonic treatment, adding a solution of N-polyalkylenepolyamine-substituted alkenylsuccinimide in a hydrocarbon solvent to the aqueous suspension and stirring the resulting mixture, thereby forming an emulsion and adsorbing the N-polyalkylenepolyamine-substituted alkenylsuccinimide onto the fine particles of ferrites, distilling off water and the hydrocarbon solvent therefrom, and dispersing the fine particles of N-polyalkylenepolyamine-substituted alkenylsuccinimide-adsorbed ferrites into a base oil of low vapor pressure having a vapor pressure of not more than 0.1 mmHg at 25° C.

8. A process according to claim 7 wherein the formation of the emulsion and the adsorption of the N-polyalkylenepolyamine-substituted alkenylsuccinimide onto the fine particles of ferrites by stirring is carried out at a temperature of about 40° to about 90° C.

9. A process according to claim 7 wherein the aqueous suspension of fine particles of ferrites is obtained by coprecipitation.

10. A process according to claim 7 wherein the N-polyalkylenepolyamine-substituted alkenylsuccinimide is represented by the following formulae:

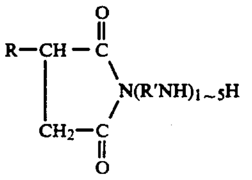

or

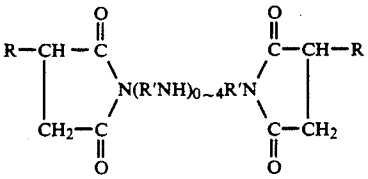

wherein R is a hydrocarbon group having 12 to 24 carbon atoms or a polybutenyl group having a molecular weight of about 300 to about 2,000 and R' is an alkylene group having 1 to 6 carbon atoms and can be the same or different when at least two of R' are repeated.

11. A process according to claim 7 wherein the base oil of low vapor pressure is natural oil, synthetic oil or an additive-containing lubricating oil.

12. A process for producing a magnetic fluid, which comprises adding a solution of N-polyalkylenepolyamine-substituted alkenylsuccinimide in a hydrocarbon solvent having a higher boiling point than that of water to an aqueous suspension of fine particles of ferrites and stirring the resulting mixture, thereby forming an emulsion and adsorbing the N-polyalkylenepolyamine-substituted alkenylsuccinimide onto the fine particles of ferrites, then distilling off water therefrom, adding a coagulation solvent to the dispersion in the hydrocarbon solvent recovering the fine particles of N-polyalkylenepolyamine-substituted alkenylsuccinimide-adsorbed ferrites, and dispersing the recovered fine particles into a base oil of low vapor pressure having a vapor pressure of not more than 0.1 mmHg at 25° C.

13. A process according to claim 12, which comprises forming the emulsion while heating and stirring.

14. A process according to claim 12 wherein the formation of the emulsion and the adsorption of the N-polyalkylenepolyamine-substituted alkenylsuccinimide onto the fine particles by stirring is carried out at a temperature of about 40° to about 90° C.

15. A process according to claim 12 wherein the aqueous suspension of fine particles of ferrites is obtained by coprecipitation.

16. A process according to claim 12 wherein the N-polyalkylenepolyamine-substituted alkenylsuccinimide is represented by the following formulae:

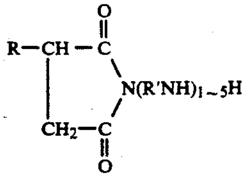

or

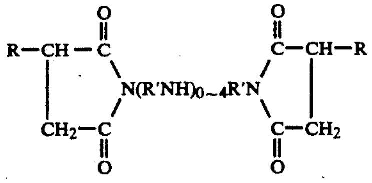

wherein R is a hydrocarbon group having 12 to 24 carbon atoms or a polybutenyl group having a molecular weight of about 300 to about 2,000 and R' is an alkylene group having 1 to 6 carbon atoms and can be the same or different when at least two of R' are repeated.

17. A process according to claim 12 wherein the base oil of low vapor pressure is natural oil, synthetic oil or an additive-containing lubricating oil.

18. A process for producing a magnetic fluid, which comprises adding a solution of N-polyalkylenepolyamine-substituted alkenylsuccinimide in a hydrocarbon solvent to an aqueous suspension of fine particles of ferrites, stirring the resulting mixture to form an emulsion, adding an organic solvent, which is miscible with the hydrocarbon solvent and in which the N-polyalkylenepolyamine-substituted alkenylsuccinimide is sparringly soluble or insoluble, thereto slowly, thereby adsorbing the N-polyalkylenepolyamine-substituted alkenylsuccinimide onto the fine particles of ferrites, then distilling off the organic solvent, water and the hydrocarbon solvent therefrom, and dispersing the fine particles of N-polyalkylenepolyamine-substituted alkenylsuccinimide-adsorbed ferrites into a base oil of low vapor pressure having a vapor pressure of not more than 0.1 mmHg at 25° C.

19. A process according to claim 18 wherein the formation of the emulsion and the adsorption of the N-polyalkylenepolyamine-substituted alkenylsuccinimide onto the fine particles of ferrites by stirring is carried out at a temperature of about 40° to about 90° C.

20. A process according to claim 18 wherein the aqueous suspension of fine particles of ferrites is obtained by coprecipitation.

21. A process according to claim 18 wherein the N-polyalkylenepolyamine-substituted alkenylsuccinimide is represented by the following formulae:

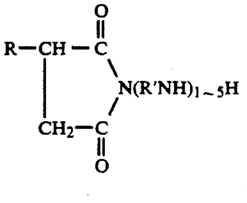

or

-continued

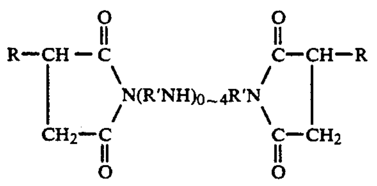

wherein R is a hydrocarbon group having 12 to 24 carbon atoms or a polybutenyl group having a molecular weight of about 300 to about 2,000 and R' is an alkylene group having 1 to 6 carbon atoms and can be the same or different when at least two of R' are repeated.

22. A process according to claim 18 wherein the organic solvent, which is miscible with the hydrocarbon solvent and in which the N-polyalkylenepolyamine-substituted alkenylsuccinimide is sparringly soluble or insoluble, is an alcohol or a ketone.

23. A process according to claim 18 wherein the base oil of low vapor pressure is natural oil, synthetic oil or an additive-containing lubricating oil.

24. A process for producing a magnetic fluid, which comprises adding ion of ferrite-constituting metals to an aqueous suspension of fine particles of ferrites, absorbing the ion of the ferrite-constituting metals onto the fine particles of ferrites, adding a solution of N-polyalkylenepolyamine-substituted alkenylsuccinimide in a hydrocarbon solvent thereto and stirring the resulting mixture, thereby forming an emulsion and adsorbing the N-polyalkylenepolyamine-substituted alkenylsuccinimide onto the fine particles of ferrites, distilling off water and the hydrocarbon solvent therefrom, and dispersing the fine particles of N-polyalkylenepolyamine-substituted alkenylsuccinimide-absorbed ferrites into a base oil of low vapor pressure having a vapor pressure of not more than 0.1 mmHg at 25° C.

25. A process according to claim 24 wherein the formation of the emulsion and the adsorption of the N-polyalkylenepolyamine-substituted alkenylsuccinimide onto the fine particles of ferrites by stirring is carried out at a temperature of about 40° to about 90° C.

26. A process according to claim 24 wherein the aqueous suspension of fine particles of ferrites is obtained by coprecipitation.

27. A process according to claim 24 wherein the ion of ferrite-constituting metals is a metal ion formed from the chloride, sulfate or nitrate of Fe, Ni, Zn or Co.

28. A process according to claim 24 wherein the N-polyalkylenepolyamine-substituted alkenylsuccinimide is represented by the following formulae:

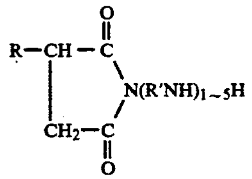

or

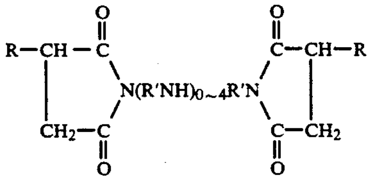

wherein R is a hydrocarbon group having 12 to 24 carbon atoms or a polybutenyl group having a molecular weight of about 300 to about 2,000 and R' is an alkylene group having 1 to 6 carbon atoms and can be the same or different when at least two of R' are repeated.

29. A process according to claim 24 wherein the base oil of low vapor pressure is natural oil, synthetic oil or an additive-containing lubricating oil.

* * * * *